United States Patent
Leon et al.

(10) Patent No.: US 8,595,013 B1
(45) Date of Patent: Nov. 26, 2013

(54) OPEN FRAMEWORK DEFINITION FOR SPEECH APPLICATION DESIGN

(75) Inventors: Edgar J. Leon, Omaha, NE (US);
Summer Limbo, Omaha, NE (US);
Shipra Gupta, Omaha, NE (US);
Catherine Rivier, Omaha, NE (US)

(73) Assignee: West Corporation, Omaha, NE (US)

( * ) Notice: Subject to any disclaimer, the term of this patent is extended or adjusted under 35 U.S.C. 154(b) by 782 days.

(21) Appl. No.: 12/028,082

(22) Filed: Feb. 8, 2008

(51) Int. Cl.
*G10L 21/00* (2013.01)

(52) U.S. Cl.
USPC ........ 704/270; 704/260; 704/270.1; 719/311; 715/751

(58) Field of Classification Search
USPC .................. 704/260, 270, 270.1; 719/311
See application file for complete search history.

(56) References Cited

U.S. PATENT DOCUMENTS

| | | | | |
|---|---|---|---|---|
| 7,127,700 B2 * | 10/2006 | Large | | 717/100 |
| 2005/0028085 A1 * | 2/2005 | Irwin et al. | | 715/513 |
| 2005/0080628 A1 * | 4/2005 | Kuperstein | | 704/270.1 |
| 2005/0091057 A1 * | 4/2005 | Phillips et al. | | 704/270.1 |
| 2006/0026506 A1 * | 2/2006 | Kristiansen et al. | | 715/517 |
| 2006/0230410 A1 * | 10/2006 | Kurganov et al. | | 719/311 |
| 2007/0220497 A1 * | 9/2007 | Chudukatil et al. | | 717/140 |
| 2009/0192849 A1 * | 7/2009 | Hughes et al. | | 705/7 |

OTHER PUBLICATIONS

Adobe Systems Incorporated "Portable Document Format Reference Manual" version 1.2, Nov. 1996.*

* cited by examiner

*Primary Examiner* — Vincent P Harper (57) ABSTRACT

A method, a system, and computer readable medium comprising instructions for an open framework for speech application design are provided. The method comprises defining at least one element of a speech application, creating a design for a first step in designing the speech application using a data presentation element, storing the design in a repository using a data repository element, generating a design for a second step in designing the speech application using a data generation element, and presenting the design for the second step using the data presentation element.

23 Claims, 8 Drawing Sheets

```xml
<?xml version="1.0"?>
<xsd:schema xmlns:xsd="http://www.w3.org/2001/XMLSchema" attributeFormDefault="qualified"
elementFormDefault="qualified" version="0.1" targetNamespace="west_ps_vui" xmlns="west_ps_vui">
    <xsd:annotation>
        <xsd:documentation xml:lang="en">VUI schema          502
</xsd:documentation>
    </xsd:annotation>
        <xsd:simpleType name="WPS_DtmfType">          504
            <xsd:restriction base="xsd:string">
                <xsd:length value="1"/>
                <xsd:enumeration value="1"/>
                <xsd:enumeration value="2"/>
                <xsd:enumeration value="3"/>
            </xsd:restriction>
        </xsd:simpleType>
        <xsd:simpleType name="WPS_InteractionType">          506
            <xsd:restriction base="xsd:string">
                <xsd:enumeration value="Initial"/>
                <xsd:enumeration value="InitialASR"/>
                <xsd:enumeration value="InitialDTMF"/>
            </xsd:restriction>
        </xsd:simpleType>
        <xsd:simpleType name="WPS_LanguageType">          508
            <xsd:restriction base="xsd:string">
                <xsd:enumeration value="English"/>
                <xsd:enumeration value="Spanish"/>
            </xsd:restriction>
        </xsd:simpleType>
        <xsd:simpleType name="WPS_InteractionEnumeratorType">          510
            <xsd:restriction base="xsd:string">
                <xsd:enumeration value="wps_menu"/>
                <xsd:enumeration value="wps_dataentry"/>
            </xsd:restriction>
        </xsd:simpleType>
        <xsd:simpleType name="WPS_VarTypeEnumType">          512
            <xsd:restriction base="xsd:string">
                <xsd:enumeration value="Boolean"/>
                <xsd:enumeration value="String"/>
                <xsd:enumeration value="Date"/>
            </xsd:restriction>
        </xsd:simpleType>
        <xsd:simpleType name="WPS_VarSourceType">          514
            <xsd:restriction base="xsd:string">
                <xsd:enumeration value="BackEnd"/>
                <xsd:enumeration value="Database"/>
            </xsd:restriction>
        </xsd:simpleType>
        <xsd:element name="VUIDocument" type="VUIDocumentType"/>          516
        <xsd:complexType name="VUIDocumentType">
            <xsd:all>
                <xsd:element name="VuiHeaderSection" type="VuiHeaderType"/>
                <xsd:element name="VuiVarDefinitionSection" minOccurs="0">
</xsd:complexType>
</xsd:schema>
```

OPEN FRAMEWORK DEFINITION FOR SPEECH APPLICATION DESIGN

CROSS REFERENCE TO RELATED APPLICATIONS

The present application is related to commonly assigned U.S. patent application Ser. No. 12/028,093 entitled INTERACTIVE VOICE RESPONSE DATA COLLECTION OBJECT FRAMEWORK AND VERTICAL BENCHMARKING AND BOOTSTRAPPING ENGINE filed on even date herewith, the entire contents of which are incorporated by reference herein.

FIELD OF THE DISCLOSURE

The present disclosure relates generally to speech application design. More particularly, the present disclosure provides a method, a system, and a computer readable medium comprising instructions for an open framework definition for speech application design.

BACKGROUND OF THE DISCLOSURE

In designing speech applications, designers are confronted with many challenges because of multidisciplinary efforts involved in designing such applications. These efforts include the need for speech elements, business rules, interaction considerations, and other requirements. Because of diversity of these efforts, many stakeholders may be involved in the design process. For example, a speech application design team may compose of at least a user-interface designer, a grammar developer, a speech analyst, a project manager, an application developer, analysts, and other managers.

With the current design process, communications and coordination among different stakeholders on the design team may be difficult. Also, sharing information and work products among team members may become a challenge, because each member may update his or her own design while it is shared by other team members. Making new information and design available to other stakeholders in a productive manner has now become a priority in the design process. What is needed is a design framework that generates a speech application designer that is common to all stakeholders. In addition, the design framework should scale to the size of the design team and should be modifiable by different stakeholders. With a scalable, common, and modifiable design framework, time-to-market of speech applications may be minimized. Also with such framework, management capabilities and accountability may be increased and knowledge may be stored and reused by team members.

SUMMARY OF THE DISCLOSURE

A method for designing speech application is provided. In one embodiment, the method comprises defining at least one element of a speech application, creating a design for a first step in designing the speech application using a data presentation element, storing the design in a repository using a data repository element, generating a design for a second step in designing the speech application using a data generation element, and presenting the design for the second step using the data presentation element.

In an alternative embodiment, a system for designing speech application is provided. The system comprises a data processing system accessible by at least one stakeholder involved in designing the speech application, a server comprising an open framework for designing the speech application; and a data repository for storing at least one design of the speech application. The open framework comprises an extensible markup language wrapper, an integration engine, and a dialog design document.

BRIEF DESCRIPTION OF THE DRAWINGS

FIG. 5 depicts a diagram illustrating an exemplary definition of data repository elements in accordance with one embodiment of the present disclosure;

DETAILED DESCRIPTION OF THE INVENTION

Figure 1:
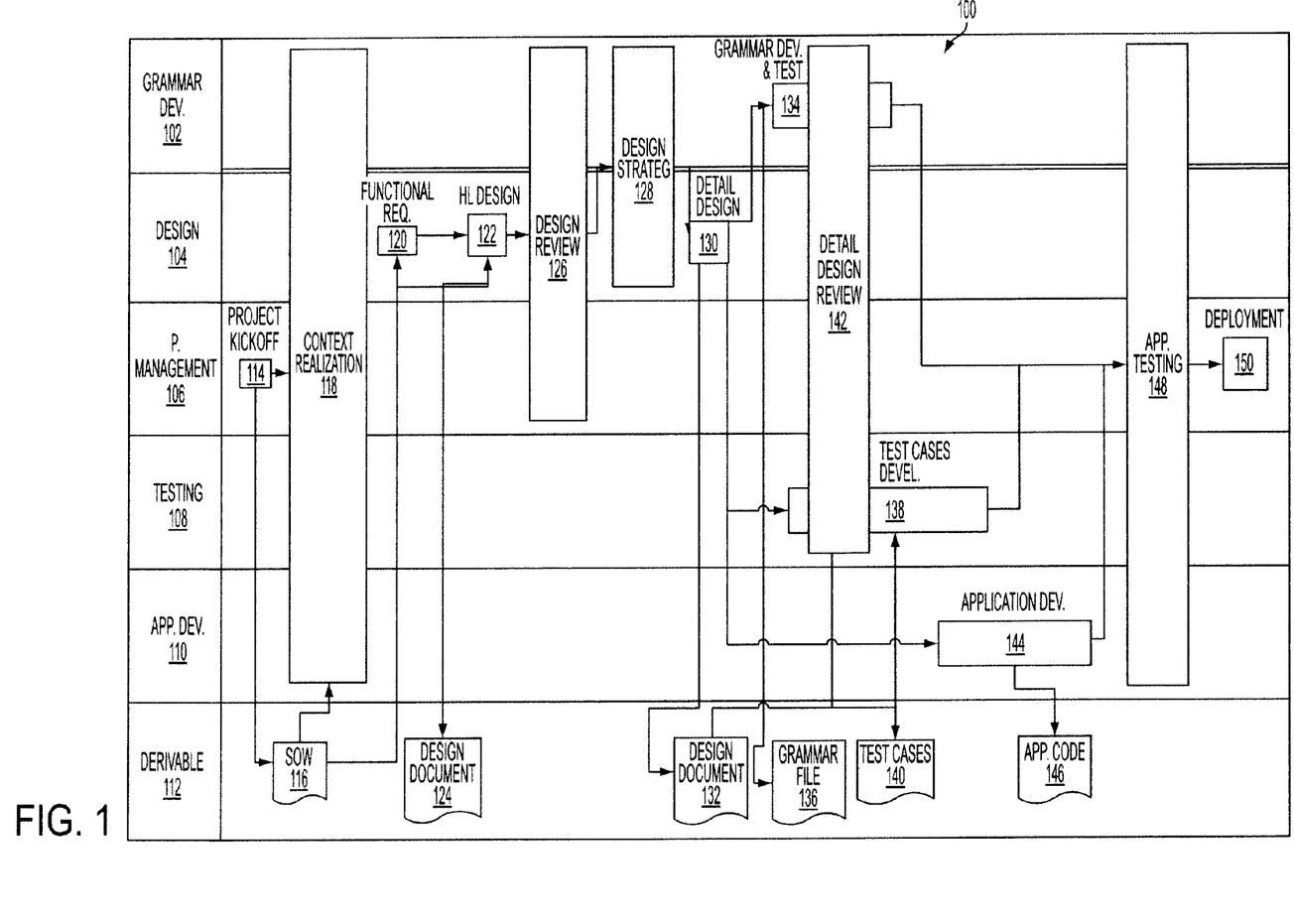
FIG. 1 depicts a diagram of current process for speech application design and development in accordance with an embodiment of the disclosure.

With reference to the figures and in particular with reference to FIG. 1, a diagram of current process for speech application design and development is depicted in accordance with an embodiment of the disclosure. In this exemplary design project, stakeholders involved include grammar developers 102, designers 104, project managers 106, testing analysts 108, and application developers 110. Each of the stakeholders may generate one or more derivable 112.

In this example, design process 100 begins when project managers 106 kicks off a project 114. The kickoff 114 generates a statement of work (SOW) 116 and the context of the project is then realized 118 through the SOW 116 to the stakeholders. The statement of work (SOW) 116 also helps designers 104 to generate functional requirements 120. With functional requirements 120, designers further develop a high level design 122 and design documents 124 reflecting the high level design 122.

A high level design review 126 is then conducted among project managers 106, designers 104, and grammar developers 102. During the review 126, designers 104 and grammar developers 102 select one or more design strategies 128. Based on the selected strategies, designers 104 develop a detailed design 130 and design documents 132. Grammar developers 102 then develop grammar and perform grammar testing 134 for the speech application based on the design documents 132. The developed grammar is stored in a grammar file 136. Also based on the design documents 132, testing analysts 108 develop various test cases 138 for the design and the developed test cases 140 are stored. At the time grammar and test cases are developed, a detailed design review 142 is conducted among testing analysts 108, project managers 106, designers 104, and grammar developers 102 to ensure that the developed grammar and test cases work with the detailed design as intended.

After detailed design review 142 is conducted and satisfactory results are achieved, application developers 110 develop the speech application 144 based on the detailed design 130 and application code 146 is generated by application developers 110. After the speech application is developed, application testing 148 is performed among application developers 110, testing analysts 108, project managers 106, designers 104, and grammar developers 102. To conduct application testing 148, the grammar file 136 and test cases 140 are used. If application testing 148 is successful, project managers 106 approve the speech application to be deployed 150.

In design process 100, each derivable 112 may be generated by different stakeholders and thus is independent from one another. For example, design documents 124 and 132 generated by designers 104 are independent from grammar file 136 and test cases 140, even though grammar file 136 and test cases 140 are generated based on information in design documents 124 and 132. Derivable of the next process step in process 100 cannot be generated from the derivable generated in the previous process step. This affects coordination and communication among the design team as well as sharing of work products that may affect later design process steps.

Aspects of the present disclosure provide an open framework definition for speech application design that define how elements of speech application design are presented for modification, storage, and interpretation, such that different stakeholders involved may interact with these elements throughout the entire design process. With this open framework, the time-to-market of the speech application is reduced. In addition, coordination and communication among the design team and sharing of information are improved, because derivable of one process step may be used to generate derivable of the next process step with these common design elements.

In one embodiment of the present disclosure, elements of speech application design may be divided into three main groups: data presentation elements, data repository elements, and data generate elements. Data presentation elements define information on how data is presented for modification, analysis, and use in a speech application design. Data repository elements define a structure in which data is stored. Data generation elements define how aggregated data and information are generated based on design elements at hand. Data generation elements enable next process step derivables to be generated from previous process step derivables.

Figure 2:
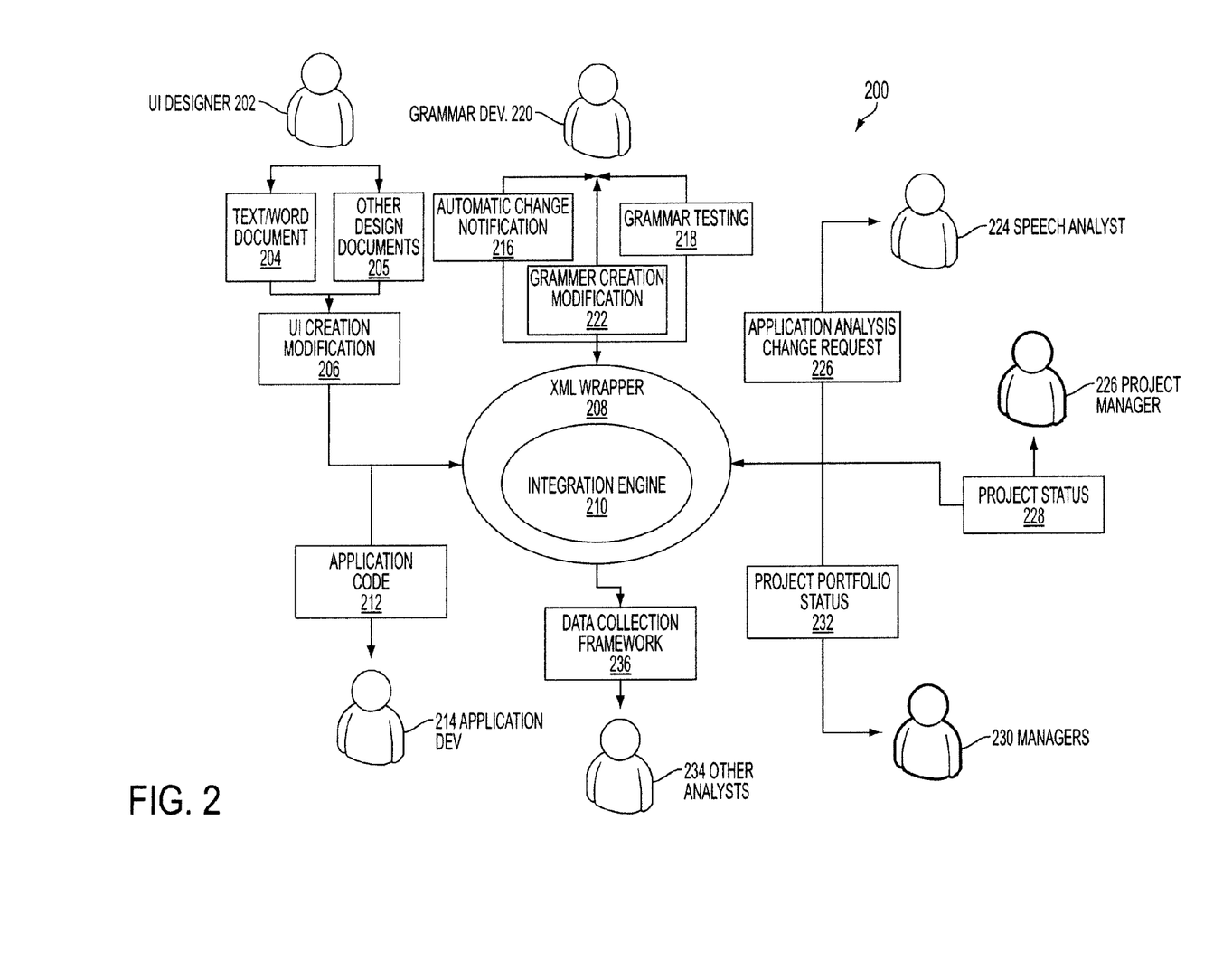
FIG. 2 depicts a diagram illustrating an exemplary architecture of the open framework for speech application design in accordance with one embodiment of the present disclosure.

Referring to FIG. 2, a diagram illustrating an exemplary architecture of the open framework for speech application design is depicted in accordance with one embodiment of the present disclosure. In open framework 200, stakeholders develop documents for their own portion of the design process using common design elements. For example, UI designer 202 developed the user interface in a text or Word document 204 or other design documents 205 and stores the document in a repository based on the structure defined in the data repository elements. The open framework 200 then takes the text or Word document 204 and generates a user interface creation modification document 206 using data presentation elements.

Because common design elements are defined in extensible markup language (XML) format, open framework 200 comprises an XML wrapper 208 for wrapping and unwrapping design elements provided by different stakeholders. Upon receiving the user interface creation modification document 206 in XML, XML wrapper 208 unwraps the information in the document. If other derivable can be generated from this document, open framework 200 provides an integration engine 210 that integrates the information and generates the derivable using data generation elements for the next process step. For example, based on the user interface creation modification document 206, application code 212 may be generated using the data generation elements in the integration engine 210. Once application code 212 is generated, the code may be wrapped in XML using the XML wrapper 208 and presented to the application developer 214.

Using common design elements, open framework 200 may provide automatic change notification 216 and grammar testing 218 to grammar developers 220. In turn, grammar developers 220 may create and modify the grammar using the grammar creation and modification document 222 provided by open framework 200 in XML format. Other stakeholders may also use common design elements to share their information and perform their tasks in the design process. For example, speech analysts 224 may receive an analysis of the speech application design and send a change request 226 to designers for modification. Also with common design elements, project managers 226 may communicate project status 228 with other stakeholders using common design elements, other managers 230 may monitor status of their project portfolios 232, and other analysts 234 may analyze collected data using data repository elements in the data collection framework 236.

Figure 3:
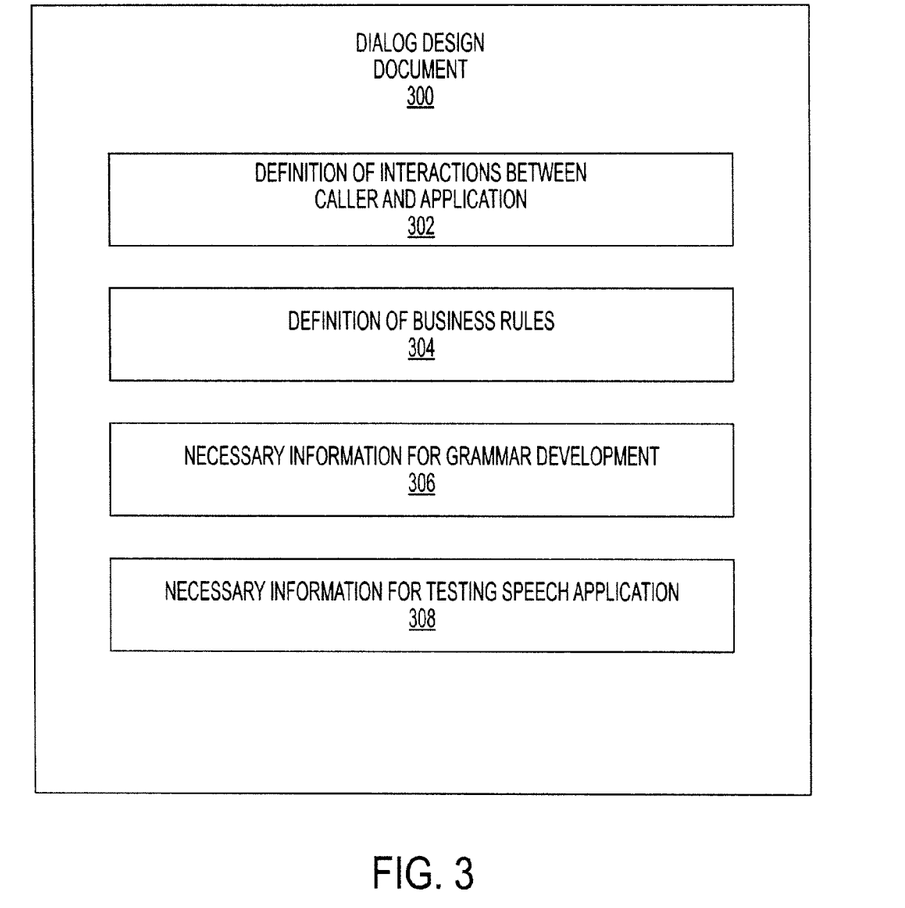
FIG. 3 depicts a diagram illustrating an exemplary dialog design document in accordance with one embodiment of the present disclosure.

In order to have design elements commonly understood by different stakeholders, an aspect of the present disclosure provides a dialog design document that is shared among different stakeholders throughout the design process. Referring to FIG. 3, a diagram illustrating an exemplary dialog design document is depicted in accordance with one embodiment of the present disclosure. In one embodiment, dialog design document 300 may be implemented as an XML document that may be parsed by an XML parser commonly used by one of ordinary skill in the art. However, dialog design document 300 may be implemented in other formats without departing the spirit and scope of the present disclosure.

In this example, dialog design document 300 comprises definition of interactions between the caller and the speech application 302. For example, definition of how the caller of the speech application may interface with a certain prompt of the call flow. Dialog design document 300 also comprises the definition of business rules 304. The definition of business rules 304 may be interpreted as functional requirements 120 by the designers. Dialog design document 300 further comprises necessary information for grammar development 306, for example, rules for developing a question prompt. Grammar developers may use this information to develop grammar and perform testing. Dialog design document 300 may comprise necessary information for testing the speech application 308, for example, test cases. Testing analysts may use this information to perform testing on the speech application.

In one embodiment of the present disclosure, dialog design document 300 provides enumeration of different forms of design elements including prompts in a call flow, dialog states, grammars, variables, business rules, concatenation strategies, and languages. With dialog design document 300, design elements may be accessed by designers and grammar developers. In addition, with common design elements as defined in the dialog design document 300, different parts of the design process may be integrated and automatic generation of derivables may be accomplished. This provides a greater control in the quality of the design. Furthermore, with dialog design document implemented in XML format, integration with design documents defined in other formats, such as text or Word documents, may be made possible. As a result of common design elements defined by dialog design document 300, versions of documents may now be controlled.

Figure 4:
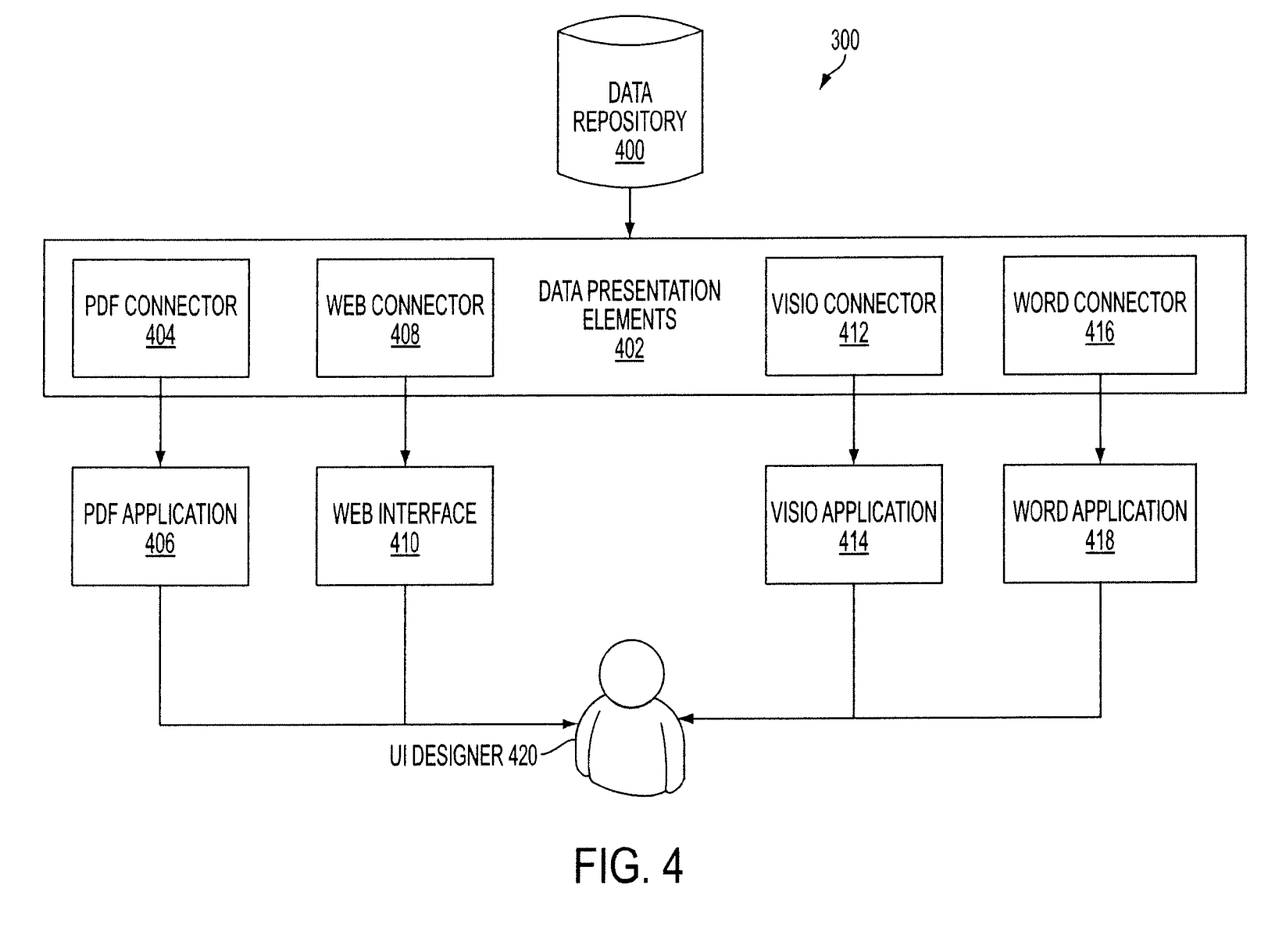
FIG. 4 depicts a diagram illustrating an exemplary architecture for data presentation elements in accordance with one embodiment of the present disclosure.

As discussed above, data presentation elements may be used to define how data is presented for modification, analysis and use by different stakeholders. For example, data presentation elements may be used to define how data in a text or Word document generated by a user-interface designer may be presented. Referring to FIG. 4, a diagram illustrating an exemplary architecture for data presentation elements is depicted in accordance with one embodiment of the present disclosure.

Open framework 300 provides a data repository 400 for storage of design elements. Data presentation elements 402 define how these design elements are presented for modification, analysis, and use by different stakeholders. One way to define how these design elements are presented is by using connectors. Connectors are used to integrate and present data or design elements from data repository 400 to different applications. In this example, data presentation elements 402 include four connectors: Portable data format (PDF) connector 404, Web connector 408, Visio® connector 412, and Word connector 416. It is noted that Visio® and Word are products of Microsoft Corporation. Other types of applications may also be integrated with connectors without departing spirit and scope of the present disclosure.

PDF connector 404 interprets data or design elements from data repository 400 in PDF format, such that the data may be presented to the user interface designer 420 using PDF application 406. An example of a PDF application may be Adobe® Acrobat® Reader®, a product by Adobe Systems Incorporated. Web connector 408 interprets data or design elements from data repository 400 in a HTML format, such that the data may be presented to the user interface designer 420 using a Web interface 410. An example of a Web interface may be a Web browser. Visio® and Word connectors 412 and 416 interpret data or design elements from data repository 400 in a format that is readable by Visio 414 and Word 418 applications.

In addition to interpreting for presentation, analysis and use by different stakeholders, data presentation elements 403 also interpret data modified by different stakeholders to be stored back into data repository 400. For example, a text or Word document modified by user interface designer 420 using Word application 418 may be interpreted by Word connector 416 to be stored back into data repository 400.

Furthermore, data presentation elements 402 also keep information for version control and provide multiple accesses by different stakeholders to a single design element. In this way, consistency and reliability of design elements may be maintained.

Data repository elements define how data or design elements are stored in data repository 400. In addition, these elements provide a common definition of data structure, such that other design elements may access and modify the data. Furthermore, data repository elements maintain a catalog of data accessible by different elements. Referring to FIG. 5, a diagram illustrating an exemplary definition of data repository elements is depicted in accordance with one embodiment of the present disclosure.

In this embodiment, data definition 500 is implemented as a XML schema named VUI schema 502. Within VUI schema 502, different data types are defined for data stored in the data repository. These data types include DtmfType 504, interaction type 506, language type 508, interaction enumerator type 510, variable type 512, source type 514, and document type 516. Language type 508 defines whether the data is stored in English or Spanish. Interaction enumerator type 510 defines whether the data is a menu or a data entry. Source type 514 defines whether the source of data is a back end or a database.

With data definition 500, design elements may be stored in data repository in a type that is defined by the designers. Conversely, a designer may share design elements in the data repository based on the type of data. With such common data definition, different stakeholders may share information more easily during the design process.

Figure 6:
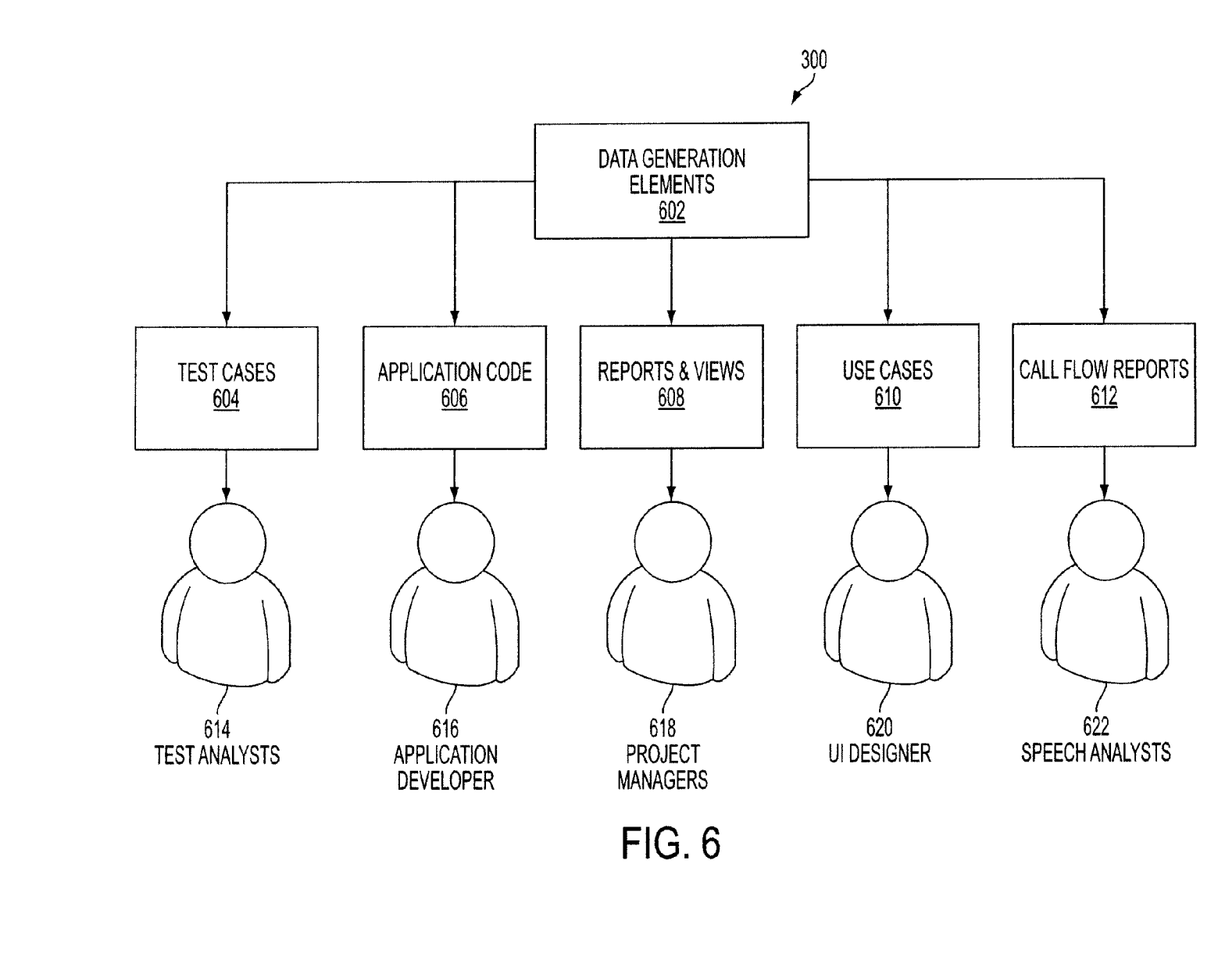
FIG. 6 depicts a diagram illustrating an exemplary architecture for data generation elements in accordance with one embodiment of the present disclosure.

Once definition is defined, derivables for different stakeholders may be generated using data generation elements. Referring to FIG. 6, a diagram illustrating an exemplary architecture for data generation elements is depicted in accordance with one embodiment of the present disclosure. Open framework 300 provides data generation elements 602, which define how aggregated data or information are generated based on the design elements at hand.

In this example, data generation elements 602 define how data may be generated into different derivables for different stakeholders. For example, test cases 604 may be generated using data generation elements 602 to be used by test analysts 614. Application code 606 may be generated using data generation elements 602 to be used by application developer 616. Reports and views 608 may be generated using data generation elements 602 to be used by project managers 618. Use cases 610 may be generated using data generation elements 602 to be used by user interface designer 620. Call flow reports 612 may be generated using data generation elements 602 by speech analysts 622.

Figure 7:
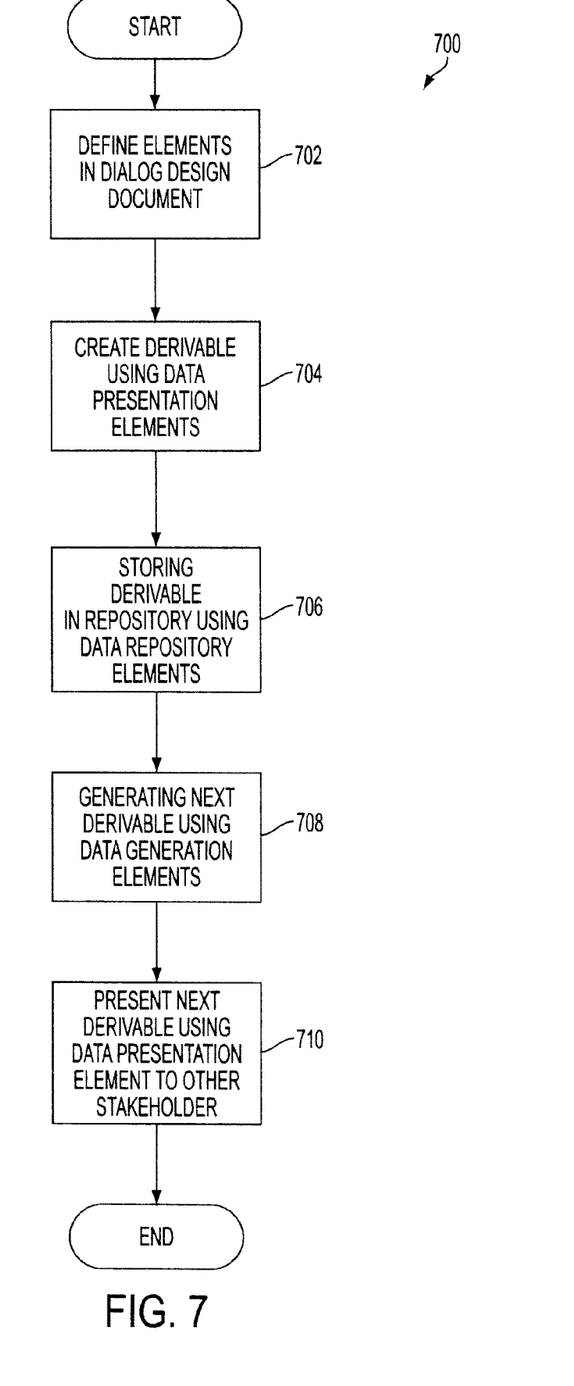
FIG. 7 depicts a flowchart of a process for designing speech application with an open framework in accordance with one embodiment of the present disclosure.

Referring to FIG. 7, a flowchart of a process for designing speech application with an open framework is depicted in accordance with one embodiment of the present disclosure. In this embodiment, open framework 300 may be used to sharing information among different stakeholders and generate next derivable based on derivable from a previous design process step. Process 700 begins at step 702 to define design elements and data for the speech application in a dialog design document, such as dialog design document 300.

Next, process 700 continues to step 704 to create derivable using data presentation elements. For example, a user interface design may create an interface using a text or Word document. Step 704 allows use cases to be generated for the user interface designer using data presentation elements. Once derivable is generated, process 700 continues to step 706 to store the derivable in a data repository using data repository elements. For example, the use cases generated in step 704 may be stored in the data repository based on the type defined in VUI schema 502. Upon request by a different stakeholder or automatically in the open framework, process 700 continues to step 708 to generate the next derivable using data generation elements. For example, use cases stored in step 706 may be used to generate application code for application developer using data generation elements. Process 700 then completes at step 710 to present the next generated derivable to other stakeholder using data presentation elements. For example, application code generated in step 708 may be presented to application developer in a Web browser using a Web connector.

Figure 8:
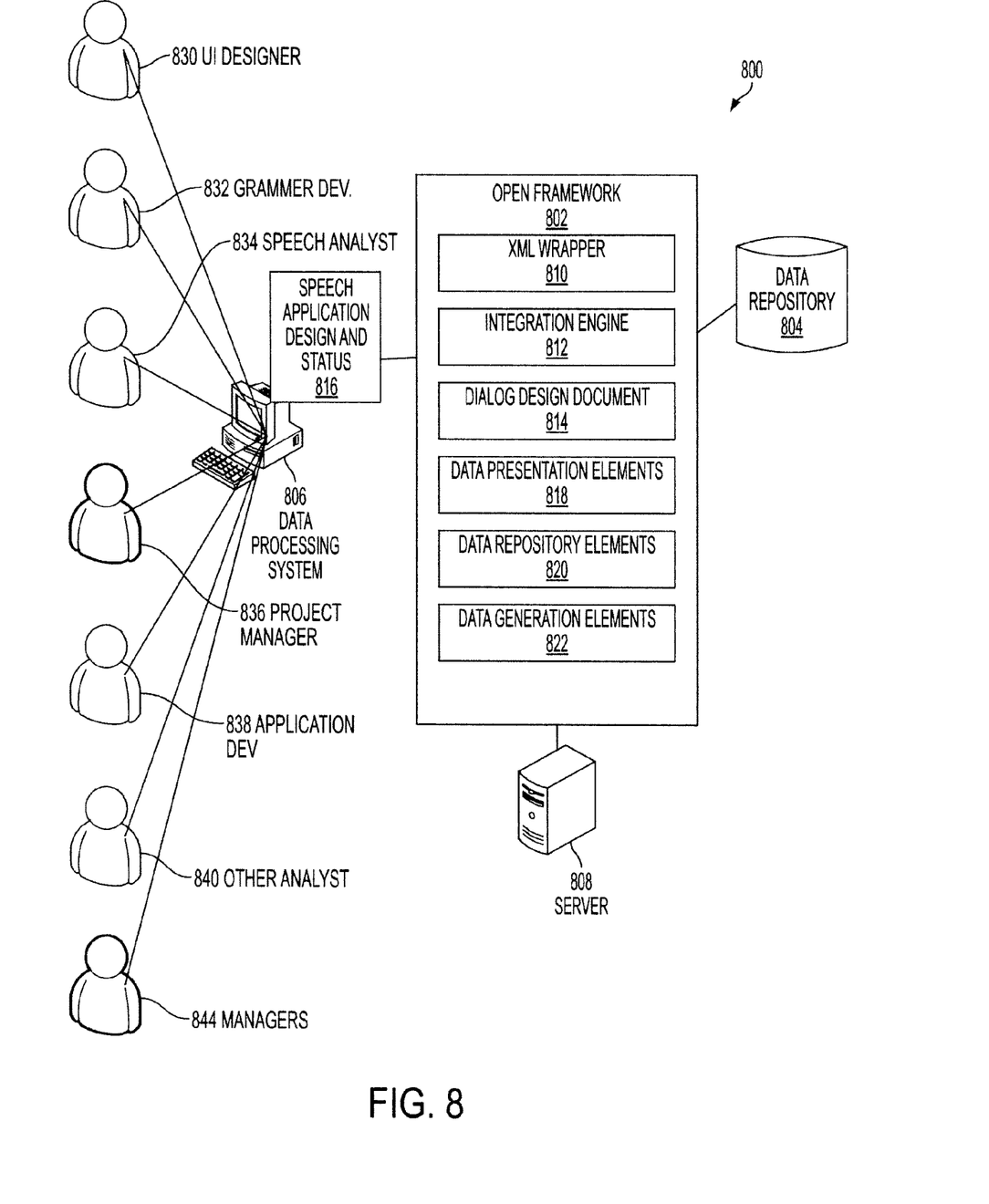
FIG. 8 depicts a diagram of a system for open framework for speech application design in accordance with one embodiment of the present disclosure.

Referring to FIG. 8, a diagram of a system for open framework for speech application design is depicted in accordance with one embodiment of the present disclosure. System 800 comprises an open framework 802, a data repository 804, data processing system 806 through which different stakeholders communicate with the open framework 802.

In one embodiment, open framework 802 may be implemented in a computer readable medium comprising instructions executing within a server 808. Systems 806 and 808 may be a data processing system, such as a desktop computer, a laptop computer, a server or any other type of device capable of sending and receive information via a wired or wireless protocol. The transfer of information or data between data processing system 806, server 808, and data repository 804 may be accomplished via at least one of a wireless protocol, a wired protocol and a combination of a wireless protocol and a wired protocol. The steps performed in this figure are performed by software, hardware, firmware, and/or the combination of software, hardware, and/or firmware.

Open framework 802 comprises an XML wrapper for wrapping and unwrapping design elements provided by different stakeholders. These stakeholders include user interface designer 830, grammar developer 832, speech analyst 834, project manager 836, application developer 838, other analysts 840, and other managers 842. In addition, open framework 802 comprises an integration engine 814 that integrates information provided by these stakeholders and generates derivables or speech application design and status 816 using design elements. Open framework 802 further comprises a dialog design document 814, which defines details of the speech application, including interactions between caller and application, business rules, grammar information, and testing information.

During the speech application design process, a stakeholder may create or modify the design for the design using data presentation elements 818. Once the design is created, derivable may be generated using data generation elements 822. Generated derivable may be stored in the data repository 804 using data repository elements 820. Different stakeholders may access or modify the design using data repository elements 820 and data presentation elements 818. Furthermore, next derivable may be generated automatically for the different stakeholder using data generation elements 822.

In summary, aspects of the present disclosure provide an open framework for speech application design. By providing a common design framework, different stakeholders involved in the design process may share information and products of their work in a productive manner. In addition, time-to-market is reduced, because next derivables may be generated from previous derivable automatically. As a result, management capabilities and accountability are increased and design may be stored and reused in an efficient manner.

Although the above descriptions set forth preferred embodiments, it will be understood that there is no intent to limit the embodiment of the disclosure by such disclosure, but rather, it is intended to cover all modifications, substitutions, and alternate implementations falling within the spirit and scope of the embodiment of the disclosure. The embodiments are intended to cover capabilities and concepts whether they be via a loosely coupled set of components or they be converged into one or more integrated components, devices, circuits, and/or software programs.

What is claimed is:

1. A computer-implemented method for designing a speech application, the method comprising:
    defining common design elements of a speech application in a dialog design document;
    creating a design for a first step in designing the speech application using a plurality of data presentation elements;
    storing the design in a repository using a data repository element;
    generating a design for a second step in designing the speech application using a data generation element, wherein the data generation element comprises at least one element for generating at least one of a test case, an application code, a report, a view, a use case, or a call flow report; and
    presenting the design for the second step using the plurality of data presentation elements wherein the plurality of data presentation elements access connectors to integrate and present data stored in the repository in a plurality of application formats, the application formats comprising a portable document format, a web markup language format, a diagramming application format, and a word processing format.

2. The method of claim 1, wherein using the common design elements, an open framework provides automatic change notification and grammar testing to grammar developers and enables project managers to communicate project status.

3. The method of claim 1, wherein the at least one common design element comprises at least one of a prompt, a dialog state, a grammar, a variable, a business rule, a concatenation strategy, or a language.

4. The method of claim 1, wherein the dialog design document is defined in an extensible markup language.

5. The method of claim 1, wherein the dialog design document defines how data is shared among at least one stakeholder in designing the speech application.

6. The method of claim 1, wherein the dialog design document comprises definition of at least one interaction between a caller and the speech application, definition of at least one business rule for the speech application, information necessary for developing grammar, and information necessary for testing the speech application.

7. The method of claim 1, wherein the plurality of data presentation elements define how data is presented for modification, analysis, and use in a design of the speech application.

8. The method of claim 1, wherein the at least one data generation element defines how aggregated data and information are generated based on at least one design element at hand.

9. The method of claim 1, wherein the data repository element defines how data is stored and retrieved in the repository.

10. The method of claim 1, wherein the common design elements are additionally used to design a set of data collection objects in the speech application.

11. The method of claim 1, wherein the common design elements are defined in extensible markup language (XML) format and are wrapped and unwrapped using an XML wrapper provided by the open framework definition.

12. The method of claim 1, wherein the plurality of data presentation elements interpret how data modified by at least one stakeholder is to be stored back into the repository.

13. The method of claim 1, wherein the plurality of data presentation elements keep information of the design for version control and allow multiple accesses to a design of the speech application.

14. The method of claim 1, wherein the data repository element comprises a catalog of data stored in the repository accessible by at least one stakeholder in designing the speech application.

15. A system for designing a speech application comprising:
    a data processing system accessible during design of the speech application;
    a server comprising an open framework for designing the speech application comprising common design elements defined in a dialog design document;

a data generating element comprising at least one element for generating at least one of a test case, an application code, a report, a view, a use case, or a call flow report;

a data repository for storing at least one design of the speech application; and a plurality of data presentation elements that access connectors to integrate and present data stored in the repository in a plurality of application formats, the application formats comprising a portable document format, a web markup language format, a diagramming application format, and a word processing format.

16. The system of claim 15, wherein the open framework comprises an extensible markup language wrapper and an integration engine.

17. The system of claim 15, wherein the open framework comprises the plurality of data presentation elements, the at least one data repository element, and the at least one data generation elements.

18. The system of claim 15, wherein the plurality of data presentation elements interprets how data modified by at least one stakeholder is to be stored back into the repository.

19. The system of claim 15, wherein the data repository element comprises at least one data type of the at least one design of the speech application.

20. The system of claim 15, wherein the at least one design of the speech application is accessible and modifiable via the data processing system using the data repository element.

21. A non-transitory computer readable medium comprising instructions for:

defining common design elements of a speech application in a dialog design document;

creating a design for a first step in designing the speech application using a plurality of data presentation elements;

storing the design in a repository using a data repository element;

generating a design for a second step in designing the speech application using a data generation element, wherein the data generation element comprises at least one element for generating at least one of a test case, an application code, a report, a view, a use case, or a call flow report; and presenting the design for the second step using the plurality of data presentation elements wherein the plurality of data presentation elements access connectors to integrate and present data stored in the repository in a plurality of application formats, the application formats comprising a portable document format, a web markup language format, a diagramming application format, and a word processing format.

22. The non-transitory computer readable medium of claim 21, further comprising instructions for:

using the common design elements, an open framework providing automatic change notification and grammar testing to grammar developers and enabling project managers to communicate project status.

23. The non-transitory computer readable medium of claim 21, further comprising instructions for:

accessing by the at least one stakeholder the at least one design element of the speech application stored in the repository using the data repository element.

\* \* \* \* \*